United States Patent
Gorbachov et al.

(10) Patent No.: US 10,165,513 B1
(45) Date of Patent: Dec. 25, 2018

(54) TRANSMIT WAKE-UP ARCHITECTURES IN RF FRONT-ENDS

(71) Applicant: OctoTech, Inc., Irvine, CA (US)

(72) Inventors: Oleksandr Gorbachov, Irvine, CA (US); Lisette L. Zhang, Redondo Beach, CA (US); Hyon Su Han, Aliso Viejo, CA (US); Raymond Biagan, Irvine, CA (US); Xu Shao, Irvine, CA (US); Floyd Ashbaugh, Trabuco Canyon, CA (US); Lothar Johannes Musiol, Laguna Beach, CA (US)

(73) Assignee: OCTOTECH, INC., Irvine, CA (US)

( * ) Notice: Subject to any disclaimer, the term of this patent is extended or adjusted under 35 U.S.C. 154(b) by 0 days.

(21) Appl. No.: 15/944,414

(22) Filed: Apr. 3, 2018

Related U.S. Application Data (60) Provisional application No. 62/598,176, filed on Dec. 13, 2017.

(51) Int. Cl.
  *H04W 52/02* (2009.01)
  *H04B 1/40* (2015.01)
  *H04L 29/08* (2006.01)

(52) U.S. Cl.
  CPC .......... *H04W 52/0229* (2013.01); *H04B 1/40* (2013.01); *H04L 67/12* (2013.01)

(58) Field of Classification Search
  CPC combination set(s) only.
  See application file for complete search history.

(56) References Cited

U.S. PATENT DOCUMENTS

| | | | |
|---|---|---|---|
| 5,203,020 A | 4/1993 | Sato et al. | |
| 9,231,710 B2 | 1/2016 | Khasnis | |
| 9,660,345 B1* | 5/2017 | Gu | H04W 16/28 |
| 2018/0048345 A1* | 2/2018 | Pehlke | H04B 1/40 |
| 2018/0131453 A1* | 5/2018 | Sharma | H04B 17/14 |
| 2018/0152898 A1* | 5/2018 | Gossner | H04B 3/08 |

OTHER PUBLICATIONS

Author: Shih-En Chen, Chin-Lung Yang; Title: A 4.5 µW 2.4 GHz Wake-Up Receiver Based on Complementary Current-Reuse RF Detector; National Cheng Kung University, Tainan Taiwan.
(Continued)

*Primary Examiner* — Junpeng Chen
(74) *Attorney, Agent, or Firm* — Eric Karich; Karich & Associates (57) ABSTRACT

A transmit wake up front-end architecture is embedded in a single chip for wireless systems which comprises a RF front end with an antenna port and a transmit-receive port. The RF front end comprises three alternate paths. These three alternate paths are enabled by two switch blocks namely input switch block and output switch block. A coupling resistor is connected from the directional coupler port to ground and isolated resistor is connected from the directional coupler isolation port to ground. An envelope detector is used which utilizes a high-frequency RF signal from a transceiver as input and provides an envelope of the original RF signal as an output and is connected to envelope amplifier. A threshold detector or circuitry is implemented in RF front-end wake up circuit connected to envelope amplifier. A logic control block is connected with the threshold circuitry switching operational modes in the RF front end.

18 Claims, 7 Drawing Sheets

(56) References Cited

OTHER PUBLICATIONS

Author: Kuang-Wei Cheng, Xin Liu & Minkyu Je; Title: A 2.4/5.8 GHz 10 μW Wake-Up Receiver With -65/-50 dBm Sensitivity Using Direct Active RF Detection; Natl Cheng Kung Univ.

Author: Toshiki Wada, Masayuki Ikeve & Eiichi Sano; Title: 60-GHz, 9-• W Wake-up Receiver for Short-Range Wireless Communications; Hokkaido Univ, Sapporo Japan; pp. 383-386.

Author: Yao Wang, Haibo Wang & Guangjun Wen; Title: A Novel Envelope Edge Detector for Ultra-low Power Sensor Wake-up Circuit; Dept Electical & Comp Eng, S Illinois Univ.

Author: Saini, Hameau, Taris, Morche, Tran & Audebert; Title: Channel Aware Receiver Front End for Low Power2.4 GHz Wireless Sensor Network; Univ of Bordeaux, Talence France.

Author: Grimminger, Kowalczyk, Unterassinger, Schwarzmeier, Fischer, Weigel & Kissinger; Title: Asynchronous Subthreshold CMOS Event Detector for Wireless BAN Sensor Nodes.

Author: Ammar, Bdiri & Derbel; Title: An Ultra-low Power Wake Up Receiver with Flip Flops based Address Decoder; 2015 12th Intl Multi-Conference on Systems, Signals & Devices.

Author: Jang, Choi, Jeong, Bang, Sylvester & Blaauw; Title: A 4.7nW 13.8ppm/° C Self-Biased Wakeup TimerUsing a Switched-Resistor Scheme; Univ of MI; 2016 Intl Solid State Conf.

Author: Nathan Michael Pletcher; Title: Ultra-Low Power Wake-Up Receivers for Wireless Sensor Networks; Dissertation; Univ of California, Berkeley, pp. 1-162.

Author: Bdiri, Derbel & Kanoun; Title: An 868MHz 7.5μW wake-up receiver with • 60dBm sensitivity; Journal Sensor Systems; Publisher: Copernicus Pub; Dec. 22, 2016; pp. 1-14.

Author: Grigoreva, Xu, & Kellerer; Title: M2M Wake-ups over Cellular Networks: Over-the-Top SIP; Univ of Munich, Published: 2016, pp. 1-6.

Author: Tang, Yomo and Kondo; Title: Wake-up receiver for radio-on-demand wireless LANs; Journal on Wireless Comm & Networking; Date: Dec. 2012.

Author: Marinkovic; Popovici & Jovanov; Title: Improving Power E ciency in WBAN Communication Using Wake Up Methods; ABB Corp. Research, Baden-Datttwil, Switzerland.

Author: Bdiri, Derbel; Title: An Ultra-Low Power Wake-Up Receiver for Real-time constrained Wireless Sensor Networks; Leipzig Univ, Leipzig, Germany; AMA Conf 2015.

Author: Mazloum, Rodrigues, Anderson, Nejdel Title: Improving practical sensitivity of energy optimizedwake-up receivers: proof of concept in 65nm CMOS; Lund Univ, 16.

Author: Garcia, Lopez, Demirkol, Casademont, Paradells, Gamm & Reindl; Title: An IEEE 802.11-enabled Wake-up Radio System: Design and Performance Evaluation.

Author: Petajajarvi, Mikhaylov & Vuohtoniemi; Title: On the human body communications: wake-up receiver design and channel characterization; Journal on Wireless Comm & Network.

Author: Hutu, Khoumeri, Villemaud & Gorce; Wake-up radio ar-chitecture for home wireless networks. IEEE Radio Wireless Symposium, Jan. 2014, Newport Beach, United States. 2014.

Author: Francois, Jules; Title: Modeling, design and implementation of a low-power FPGA based asynchronous wake-up receiver for wireless applications; S. Analog Integr; 2013.

* cited by examiner

TRANSMIT WAKE-UP ARCHITECTURES IN RF FRONT-ENDS

CROSS-REFERENCE TO RELATED APPLICATIONS

This application for a utility patent claims the benefit of U.S. Provisional Application No. 62/598,176, filed 13 Dec. 2017.

FIELD OF THE INVENTION

The invention generally relates to wireless radio wake-up circuits, and more particularly to transmit wake-up architectures in RF (Radio frequency) front-ends for battery powered wireless systems, such as those employed in WSN (Wireless sensor network) nodes as well as different small size wearable and hearable communication networks.

BACKGROUND

Wireless radio wake-up circuits have taken attention recently due to great demand of battery powered systems. Typically, receiver wake up circuits are implemented in wireless systems as the entire system most of its time is in sleep mode consuming a very small amount of battery current. A radio wake-up circuit is basically capable of both addressing and waking up not only a more efficient but also more power and energy consuming radio front end.

Wireless sensor networks have their place in various applications like environmental monitoring applications, in which WSNs provide various information, such as temperature, air pressure, and humidity. WSNs are also used in various domains like noise monitoring, military applications, control, battlefield surveillance, home networking, etc. This area is particularly important on one hand because the energy consumption of home multi-media equipment represents an important part of the overall energy consumption. On the other hand, it is important because there is a lack of methods to optimize the energy consumption of these types of equipment. At the heart of WSNs are so-called nodes, which consist of sensors and radios (wireless receivers and transmitters). These nodes after collecting the physical information, communicate it wirelessly to the central location. The radios in these nodes are normally powered by batteries, and because they are dispersed and difficult to service, it is imperative that to extend battery life and network utility, they consume negligible power. In operation, the status of WSN nodes may be interrogated wirelessly at any time. This means that the WSN nodes need not be operating continuously "ON" and thus consuming battery power, but should only be "ON" when an interrogation event occurs. Otherwise, the node that runs out of battery power becomes disconnected from the WSN.

For wearable and hearable devices such as smart watches, bluetooth headphones, etc. wireless communication nodes are employed. In these application scenarios it may be necessary to put a collection of nodes to sleep for a long period of time. At a later time, there is a need to wake up the nodes. For achieving this purpose, an RF wake up front end circuit is designed which provides optimal performance and consumes as little energy as possible while asleep. Every time a radio is turned on, a node checks for the wakeup signal. To minimize the energy or power consumption of the system while sleeping, frequency of the radio wake up signal is minimized and checking of the wakeup signal is done by nodes whenever a radio is turned on.

A number of techniques have been adopted or implemented to decrease node or radio power consumption, which involves managing their "ON" and "OFF" time. The radio is turned periodically "ON" and "OFF". This involves connecting the radio to a timer that periodically turns it "ON" or "OFF" according to a prescribed duty cycle. Furthermore, when RF front-ends are used for multi-mode platforms such as ZigBee or BLE, this requires a complicated firmware development for parts from different vendors (different signaling formats, protocols, burst width and repetition rate, coordination of transmit and receive signals in time domain, etc.) which makes the implementation of the interface cumbersome and increases time-to-market. Moreover number of GPIOs in existing wireless transceivers is limited and may not be enough to fulfil required operation in conjunction with external RF front end.

Prior art document U.S. Pat. No. 5,203,020 (Sato) discloses a radio telecommunication apparatus which is used in a radio telecommunication system wherein one or more base stations broadcast radio signals over a plurality of radio channels. The apparatus selects a radio channel out of the plurality of radio channels and detects the availability of the selected radio channel. In response to the unavailability of the selected radio channel, the apparatus is intermittently powered so as to detect the availability of the selected radio channel while conserving battery power consumption. Even if the availability of the selected radio channel is detected, only reception and transmission sections are intermittently powered so that the presence of information signals to be transmitted is detected. When no radio channel is available to receive radio signals from a base station, i.e., the apparatus is outside the geographic limit of the service area or radio signals from the base station are unable to reach the apparatus due to radio interference, the apparatus is intermittently powered by a battery. The duration of a power-on state is sufficient for the apparatus to detect the availability of the radio channel. Since the apparatus is intermittently powered when it is not served by a system, the battery power of the apparatus is conserved. Further, when the radio channel becomes available, the apparatus may detect its availability during the power-on state.

However, in the prior art, reducing power in radio telecommunication apparatus requires digital interface which interfaces data communication between radio unit and operation unit through firmware which is cumbersome and time-consuming.

Hence, there is a strong need and demand for eliminating multiple control lines, thus decreasing firmware development time and time-to-market for a wide range of wireless systems that employ wake up receiver schemes.

SUMMARY OF THE INVENTION

The present invention overcomes the above problem by introducing transmit wake-up architectures for radio frequency front ends. These radio frequency front ends, in particular, are implemented inside a single chip and only requires a certain level of transmit radio frequency power from a transceiver while switching to other modes.

A transceiver is a device that can both transmit and receive communications, in particular a combined radio transmitter and receiver. In an embedded system it is often desirable to communicate with other device wirelessly. The transmitter has RF port to transmit and receive RF signals. The wireless communication may be accomplished through radio frequency communication. For many applications, the medium of choice is RF since it does not require line of sight. RF communications incorporate a transmitter and a receiver. The RF module is a small electronic device used to transmit and receive radio signals between two devices. RF modules may comply with a defined protocol for RF communication such as ZigBee, Bluetooth low energy, or wifi (Wireless fidelity) or they may implement a proprietary protocol.

In view of the foregoing, an embodiment herein provides transmit wake-up architectures for RF front ends and implementation of transceiver circuitry in a single chip in typical wireless systems such as Bluetooth, ZigBee, etc. An external RF front end is used in the architecture to boost transmit power as well as increase the overall receive sensitivity of a system. Control of the RF front ends is typically affected from a transceiver circuitry enabling transmit chain, LNA (Low-noise amplifier) chain, receive bypass chain, and multiple antennas, which requires a separate control, different modes of operation etc., in other words, a proliferation of I/O (Input/Output) pins. The RF front-end comprises three alternate paths, namely, the transmit chain, the bypass chain, and the receive chain, from the antenna to a separate transceiver. The three alternate paths are enabled by two sets of switch blocks, one set at the input, connecting to the antenna and another set at the output connecting to the transceiver port. The transmit chain has an RF PA (power amplifier), that links the transmitter to the antenna, a receive chain with an LNA, that links the antenna to the receiver, and a bypass chain which is typically used during receive mode, but that could also be used in transmit mode when high power at antenna is not desired. In addition, the RF front-end contains a directional coupler with low insertion loss and a certain coupling coefficient, connected to the common transceiver point.

In one of the embodiment, operation of RF front end in initial steady state condition is disclosed. In steady state condition, bypass chain is in the "ON" mode while the transmit and receive chains are in the "OFF" mode. This occurs when there is an uncertain time to start the exchange of data via a wireless link (i.e. the transceiver is in sleep mode monitoring the received signal from the antenna via the bypass chain and waiting to receive a particular wake up event to start transmitting the RF signal). When RF power transmitted by the transceiver is coupled through the directional coupler (forward power) to an envelope detector, it is amplified via an envelope amplifier an applied to a threshold circuitry. Then, if a certain level is reached, the "enable" signal from a logic block is applied to enable the PA chain and disable the bypass chain. On the other hand, when the RF signal level at the TX-RX (Transmit-Receive) port is below a certain level, the threshold circuitry applies a signal to a logic block signalling to disable the PA chain and to go into the bypass mode.

In one of the embodiment, the LNA chain could be in the "ON" mode during initial steady state condition. This scenario could be employed when a pre-defined timing is known for a system (i.e. when the Transceiver is in either the sleep mode, in which it receives very small signal thus requiring LNA support). When the signal from the TX-RX port of the transceiver exceeds a certain level, the TX chain is enabled and the LNA chain is disabled. When the power level at the TX-RX goes below a certain level, then logic circuitry switches the LNA chain to the "ON" mode and the PA chain to the "OFF" mode.

In one of the embodiment, the RF front-end architecture involves the use of envelope detector and envelope amplifier which enable and disable particular logic states. These specific logic states could be hard-wired in the RF front-end block. Since specific logic states could be hard-wired in the RF front-end block, it is not necessary to use all GPIO (General purpose input output) signals from the transceiver, in which the precise time alignment between the control signals is not required. Since the envelope detector and envelope amplifier have to respond fast to enable or disable particular logic states, they should have enough bandwidth to operate with certain burst signals (i.e. >10 MHz). In this architecture, the same envelope detector and envelope amplifier circuitry could be used to protect the TX-RX port from very large signal from the transceiver.

An embodiment herein describes the use of logic control block which could be set in different states. For instance, if the initial bypass mode is used, then the RF signal from the transceiver enables the PA chain and, after the RF signal from the transceiver is disabled, the RF front end is set to the receive mode with LNA enabled. In a similar usage scenario, the initial receive mode with the LNA enabled is employed and then the RF signal from the transceiver enables the PA chain and, after the RF signal output by the transceiver is disabled, the RF front end is set into the bypass mode. The directivity of the directional coupler should be chosen in such a way that, even the largest signal anticipated to be received at the antenna (i.e. a foreign blocking signal) would not trigger the PA into the ON state. This is especially important when the initial mode with LNA enabled is used (it must be remembered that the LNA gain is fairly large, i.e. >10 decibels) and the PA gain is large (i.e. >20 decibels). Typical coupling coefficients of 15 decibels to 20 decibels as well as directivity above 15 decibels are sufficient (but do not represent an upper bound) for the proposed architecture.

In one of the embodiment, a power limiter is used in the output of LNA. This implementation of power limiter at the output of LNA reduces the probability of false triggering of TX chain into "ON" mode in the case when a large signal is received at the antenna and RF front-end initial steady-state condition is set to LNA enabled mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practised and to further enable those of skill in the art to practice the embodiments herein. Accordingly, the examples should not be construed as limiting the scope of the embodiments herein.

The embodiments herein achieve this by providing a transmit wake-up architecture in radio frequency front end which is implemented inside a single chip and only requires a certain level of transmit RF power from a transceiver while switching to other modes.

Figure 1:
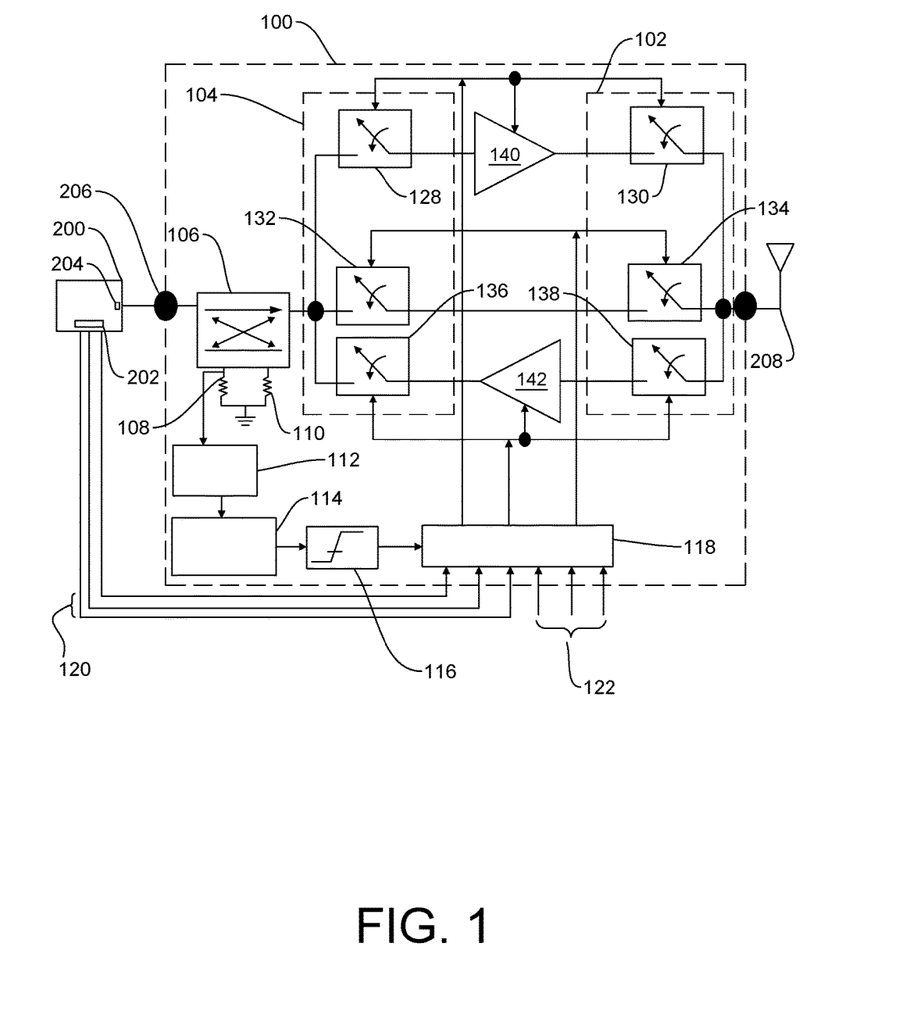
FIG. 1 illustrates a transmit wake-up architecture in radio frequency front ends with directional coupler used at the common transmit-receive chain.

FIG. 1 is a block diagram illustrating a transmit wake-up architecture in radio frequency front end 100 embedded in a single chip for wireless systems during transmit mode of operation according to one embodiment of the present invention. The RF front end 100 architecture consists of three alternate paths, namely, the transmit (PA) chain, the bypass chain, and the receive (LNA) chain, from the Antenna 208 to a separate transceiver 200. These three alternate paths are enabled by two sets of switch blocks. First set of switch block comprises switches SW2 130, SW4 134 and SW6 138 connecting to the Antenna 208 and second set of switch block comprises switches SW1 128, SW3 132 and SW5 136 connecting to the transceiver 200 port. The transceiver 200 has RF port 204 to transmit and receive RF signals and digital pins attached with control port 202 which are dedicated for control of external RF front end 100. RF front end 100 comprises a transmit chain with RF power amplifier 140, receive chain with low noise amplifier 142 and bypass chain which is typically used during receive mode but it could be also used in transmit mode when high power at the Antenna 208 is not desired. RF front end 100 comprises input switch block 104 and output switch block 102. Several GPIO pins from a transceiver 200 are connected to logic pins from the logic control of RF front end 100. This logic control decodes signal from a transceiver 200 for each particular mode of operation. The transmit wake-up architecture in FIG. 1 does not require precise time alignment between control signals 120. If TX-RX 206 power level from a transceiver 200 is going below a certain level then logic is switching LNA 142 chain "ON" and PA 140 chain is switched to "OFF" mode. If initial bypass mode is used, then RF signal from a transceiver 200 is enabling PA 140 chain and after transceiver 200 RF signal is disabled then RF front end 100 is set to "RECEIVE" mode with LNA 142 enabled. Similarly, if initial receive mode with LNA 142 enabled is used, then RF signal from a transceiver 200 is enabling PA 142 chain and after transceiver 200 RF signal is disabled then RF front end 100 is set to bypass mode. The directivity of a directional coupler 106 is chosen in such a way that even large signal anticipated to be received at Antenna 208 would not trigger PA into "ON" state. This is necessary when initial mode with LNA 142 enabled is used and PA 140 gain is large. Typical coupling co-efficient of 15 dB to 20 dB as well as directivity above 15 dB are sufficient. A coupling resistor 108 is connected from the directional coupler 106 port to ground and an isolated resistor 110 is connected from the directional coupler 106 isolation port to ground. An envelope detector 112 is used which utilizes a high-frequency RF signal from a transceiver 200 as input and provides an output which is the envelope of the original RF signal. This envelope detector 112 comprises an input terminal and an output terminal wherein the input terminal is connected to one of the directional coupler 106 coupling port. An envelope amplifier 114 is connected to envelope detector 112 comprising an input terminal and an output terminal wherein the input terminal is connected to the envelope detector 112 output terminal. A threshold detector or circuitry 116 is implemented in RF front end 100 wake up circuit comprising an input and output terminal wherein the input terminal is connected to the output terminal of the envelope amplifier 114. A logic control block 118 is provided comprising input and output terminals wherein one input terminal comprises a connection to the output terminal of the threshold detector 116 and other input terminals may comprise digital control signal lines 120 and lines providing hardwired settings 122, and wherein the output terminals are coupled to operate and control switches SW1 128, SW2 130, SW3 132, SW4 134, SW5 136, SW6 138, the power amplifier (PA) 140 and the low noise amplifier (LNA) 142. Transceiver 200 circuitry may have mismatched impedance, that is, received signal from an Antenna 208 and passed either through bypass chain or LNA 142 chain may be reflected from a transceiver 200 mismatched port and trigger PA 140 into "ON" mode.

Figure 2:
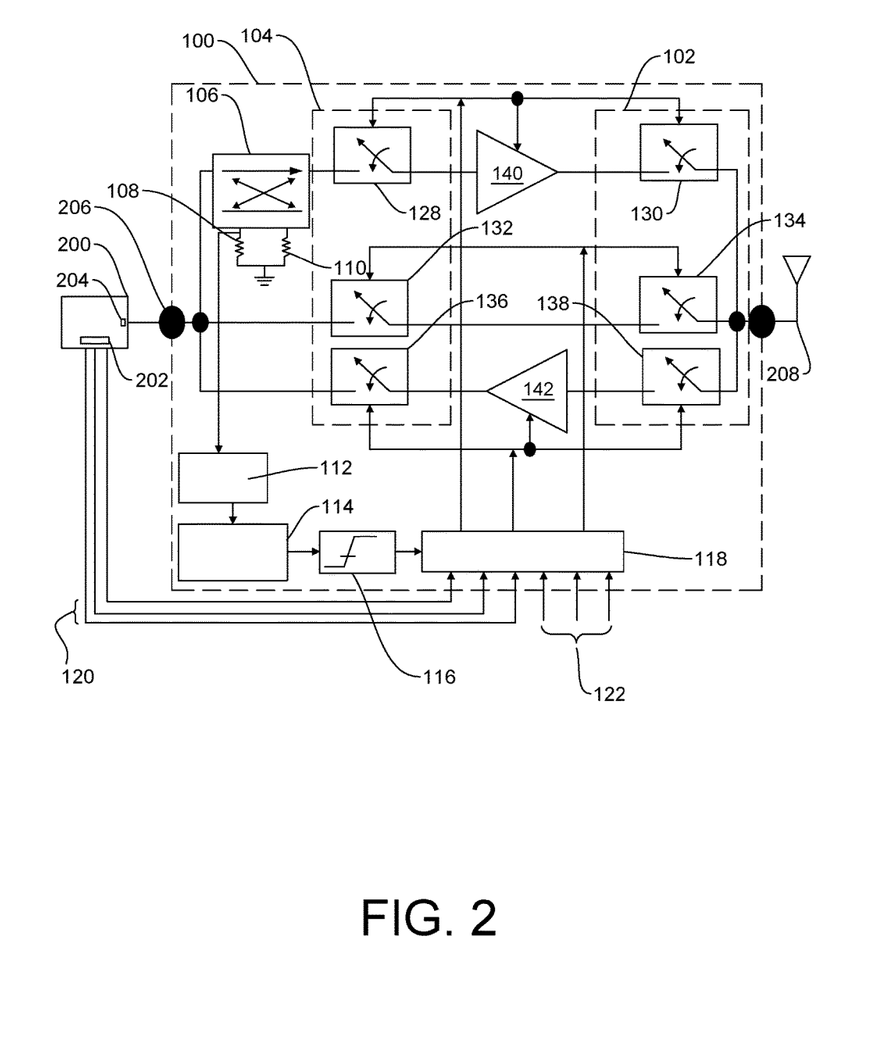
FIG. 2 illustrates a transmit wake-up architecture in radio frequency front ends with directional coupler used at the input of transmit chain.

FIG. 2 is a block diagram illustrating a transmit wake-up architecture in radio frequency front end 100 with directional coupler 106 used at the input of transmit chain. The transmit wake up RF circuit is in transmit mode. In transmit mode, RF signal from the transceiver 200 is enabling PA 140 chain and switches SW1 128, SW2 130 and power amplifier 140 are turned "ON". RF front end 100 comprises input switch block 104 and output switch block 102. Several GPIO (General purpose input-output) pins from a transceiver 200 are connected to logic pins from the logic control of RF front end 100. RF signal is taken from coupling port of a directional coupler 106. Logic control block 118 is receiving control signals 120 from the transceiver 200. This logic control decodes signal from a transceiver 200 for each particular mode of operation. A bypass chain which is typically used during receive mode could be also used in transmit mode when high power at the Antenna 208 is not desired. An envelope detector 112 is used which utilizes a high-frequency RF signal from a transceiver 200 as input and provides an output which is the envelope of the original RF signal. A coupling resistor 108 is connected from the directional coupler 106 coupling port to ground and an isolated resistor 110 is connected from the directional coupler 106 isolation port to ground. This envelope detector 112 comprises an input terminal and an output terminal wherein the input terminal is connected to one of the directional coupler 106 coupling port. An envelope amplifier 114 is connected to envelope detector 112 comprising an input terminal and an output terminal wherein the input terminal is connected to the envelope detector 112 output terminal. A threshold detector or circuitry 116 is implemented in RF front end 100 wake up circuit comprising an input and output terminal wherein the input terminal is connected to the output terminal of the envelope amplifier 114. This RF front end 100 transmit wake-up architecture removes insertion loss of a coupler 106 from bypass and LNA 142 chains thereby increasing overall system receive sensitivity.

Figure 3:
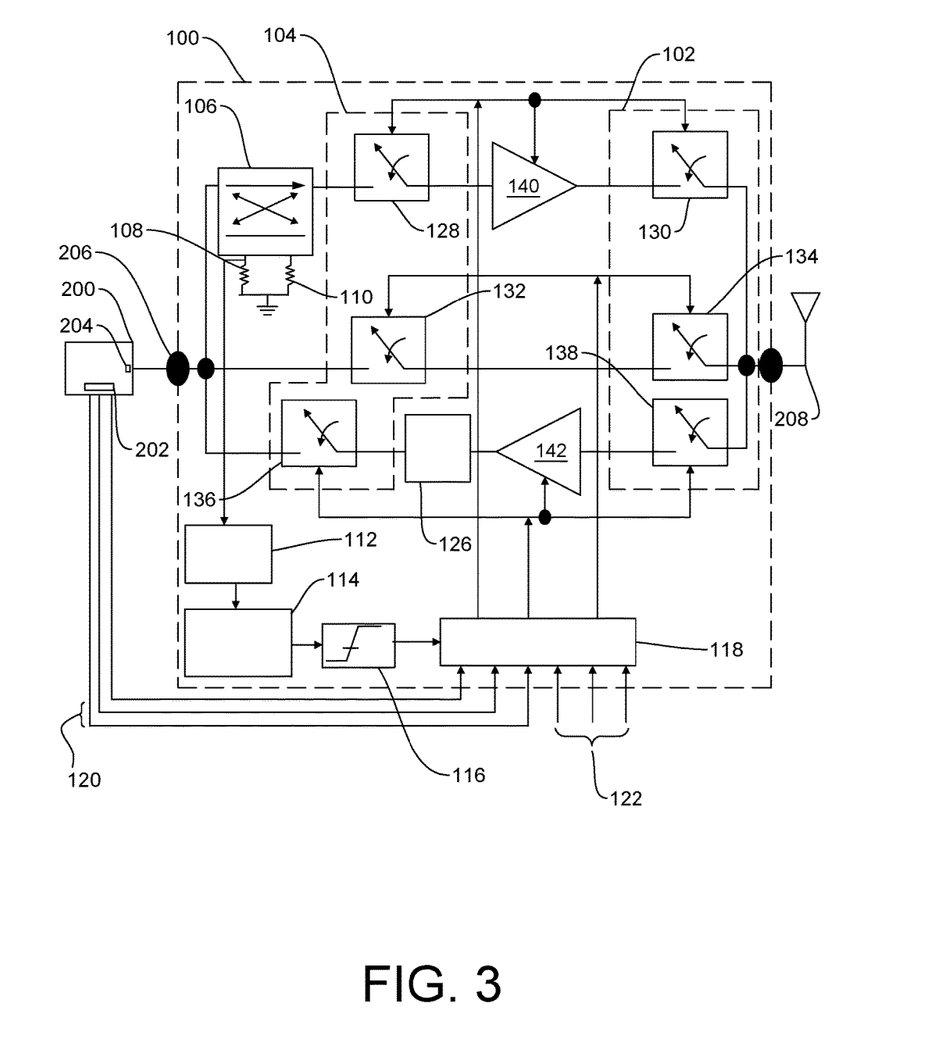
FIG. 3 illustrates a transmit wake-up architecture in radio frequency front ends with directional coupler used at the input of transmit chain and power limiter used at the output of LNA.

FIG. 3 is a block diagram illustrating a transmit wake-up architecture in radio frequency front end 100 with directional coupler 106 used at the input of transmit chain and power limiter 126 used at the output of LNA 142. The transmit wake up RF circuit is in transmit mode. In transmit mode, RF signal from the transceiver 200 is enabling PA 140 chain and switches SW1 128, SW2 130 and power amplifier 140 are turned "ON". RF front end 100 comprises input switch block 104 and output switch block 102. Logic control block 118 is receiving control signals from the transceiver 200. This logic control 118 decodes signal from a transceiver 200 for each particular mode of operation. An envelope detector 112 is used which utilizes a high-frequency RF signal from a transceiver 200 as input and provides an output which is the envelope of the original RF signal. This envelope detector 112 comprises an input terminal and an output terminal wherein the input terminal is connected to one of the directional coupler 106 coupling port. A coupling resistor 108 is connected from the directional coupler 106 coupling port to ground and an isolated resistor 110 is connected from the directional coupler 106 isolation port to ground. An envelope amplifier 114 is connected to envelope detector 112 comprising an input terminal and an output terminal wherein the input terminal is connected to the envelope detector 112 output terminal. A threshold detector or circuitry 116 is implemented in RF front end 100 wake up circuit comprising an input and output terminal wherein the input terminal is connected to the output terminal of the envelope amplifier 114. A power limiter 126 is used at the output of LNA 142 which reduces the probability of false triggering of TX-RX (Transmit-Receive) chain into "ON" mode in a case when a large signal is received at the Antenna 208 and RF front-end 100 steady state condition is set to LNA 142 enabled mode. This RF front end 100 transmit wake-up architecture removes insertion loss of a coupler 106 from bypass and LNA 142 chains thereby increasing overall system receive sensitivity. This RF front end 100 transmit wake-up architecture is preferred in a case when large blocking signals are anticipated at the antenna 208.

Figure 4:
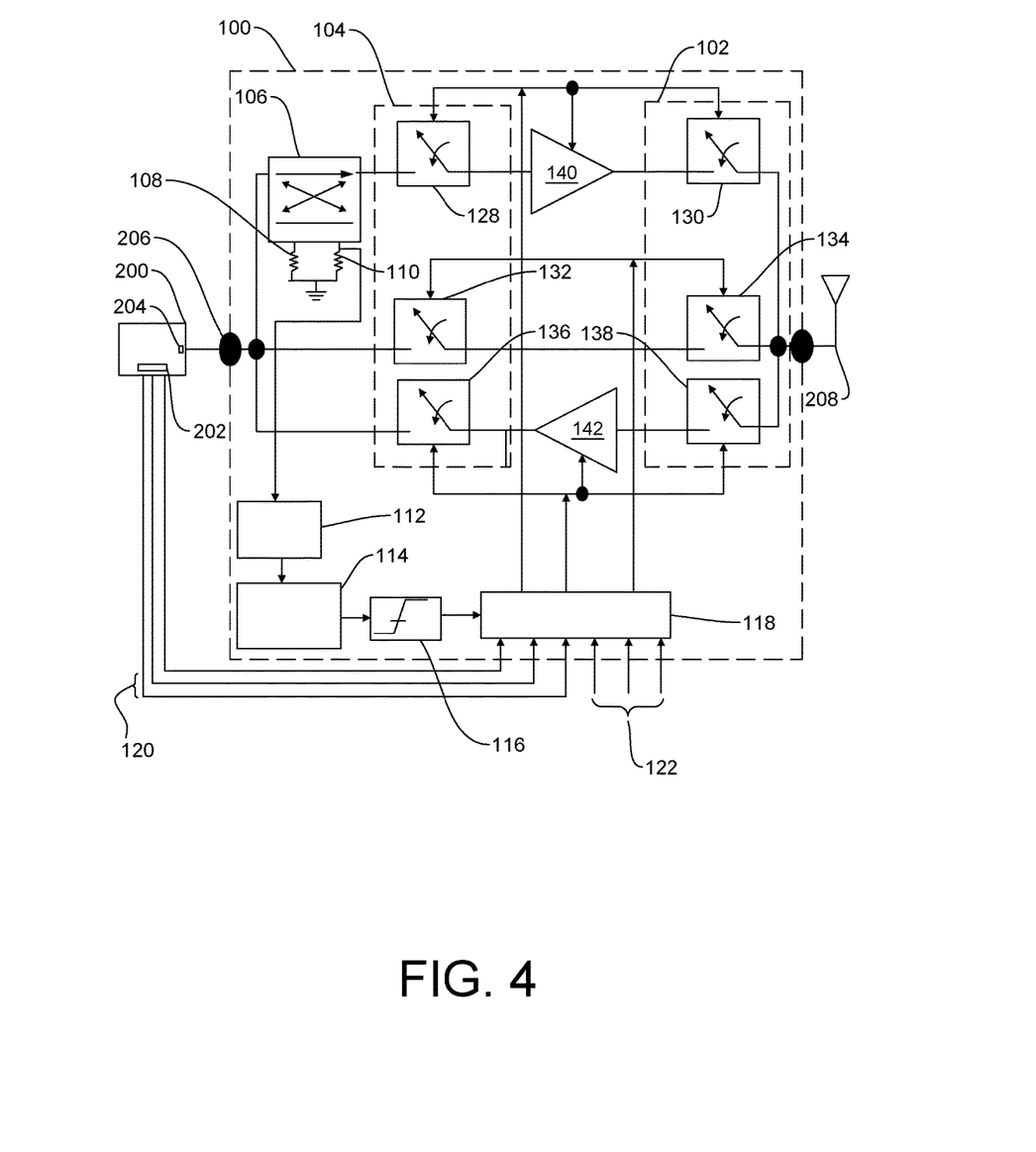
FIG. 4 is a block diagram that illustrates a transmit wake-up architecture in radio frequency front end with directional coupler used at the input of transmit chain and isolated resistor at the isolation port of directional coupler connected to envelope detector.

FIG. 4 is a block diagram illustrating a transmit wake-up architecture in radio frequency front end 100 with directional coupler 106 used at the input of transmit chain and isolated resistor 110 at the isolation port of directional coupler 106 connected to envelope detector 112. The transmit wake up RF circuit is in transmit mode. In transmit mode, RF signal from the transceiver 200 is enabling PA 140 chain and switches SW1 128, SW2 130 and power amplifier 140 are turned "ON". RF front end 100 comprises input switch block 104 and output switch block 102. Several GPIO (General purpose input-output) pins from a transceiver 200 are connected to logic pins from the logic control of RF front end 100. RF signal is taken from isolation port of a directional coupler 106. This same RF signal can be also taken from isolation port of a directional coupler 106 depending on circuit operation. Logic control block 118 is receiving control signals 120 from the transceiver 200. This logic control decodes signal from a transceiver 200 for each particular mode of operation. A bypass chain which is typically used during receive mode could be also used in transmit mode when high power at the Antenna 208 is not desired. An envelope detector 112 is used which utilizes a high-frequency RF signal from a transceiver 200 as input and provides an output which is the envelope of the original RF signal. This envelope detector 112 comprises an input terminal and an output terminal wherein the input terminal is connected to one of the directional coupler 106 coupling port. A coupling resistor 108 is connected from the directional coupler 106 coupling port to ground and an isolated resistor 110 is connected from the directional coupler 106 isolation port to ground. An envelope amplifier 114 is connected to envelope detector 112 comprising an input terminal and an output terminal wherein the input terminal is connected to the envelope detector 112 output terminal. A threshold detector or circuitry 116 is implemented in RF front end 100 wake up circuit comprising an input and output terminal wherein the input terminal is connected to the output terminal of the envelope amplifier 114. This RF front end 100 transmit wake-up architecture removes insertion loss of a coupler 106 from bypass and LNA 142 chains thereby increasing overall system receive sensitivity.

Figure 5:
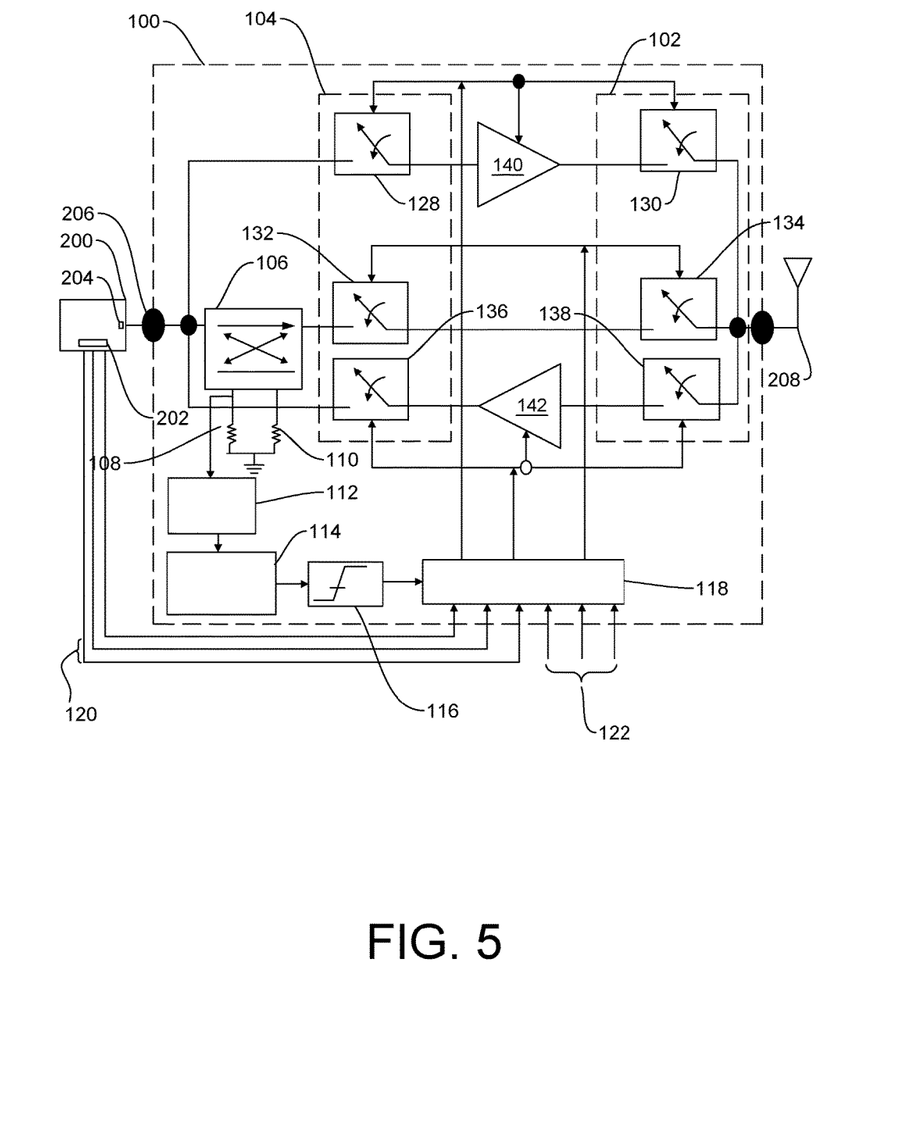
FIG. 5 illustrates a transmit wake-up architecture in radio frequency front ends with directional coupler used in bypass chain.

FIG. 5 is a block diagram illustrating a transmit wake-up architecture in radio frequency front end 100 with directional coupler 106 used in bypass chain. The transmit wake up RF circuit is in bypass mode. In bypass mode, RF signal from the transceiver 200 is enabling switches SW3 132 and SW4 134. RF front-end 100 comprises input switch block 104 and output switch block 102. Several GPIO (General purpose input-output) pins from a transceiver 200 are connected to logic pins from the logic control of RF front end 100. RF signal is taken from coupler port of a directional coupler 106. This same RF signal can be also taken from isolation port of a directional coupler 106 depending on circuit operation. Logic control block 118 is receiving control signals from the transceiver 200. This logic control 118 decodes signal from a transceiver 200 for each particular mode of operation. An envelope detector 112 is used which utilizes a high-frequency RF signal from a transceiver 200 as input and provides an output which is the envelope of the original RF signal. This envelope detector 112 comprises an input terminal and an output terminal wherein the input terminal is connected to one of the directional coupler 106 coupling port. A coupling resistor 108 is connected from the directional coupler 106 coupling port to ground and an isolated resistor 110 is connected from the directional coupler 106 isolation port to ground. An envelope amplifier 114 is connected to envelope detector 112 comprising an input terminal and an output terminal wherein the input terminal is connected to the envelope detector 112 output terminal. A threshold detector 116 is implemented in RF front end 100 wake up circuit comprising an input and output terminal wherein the input terminal is connected to the output terminal of the envelope amplifier 114. This RF front end 100 transmit wake-up architecture removes insertion loss of a coupler 106 from PA 140 and LNA 142 chains thereby increasing overall system receive sensitivity and reducing current consumption in transmit mode.

Figure 6:
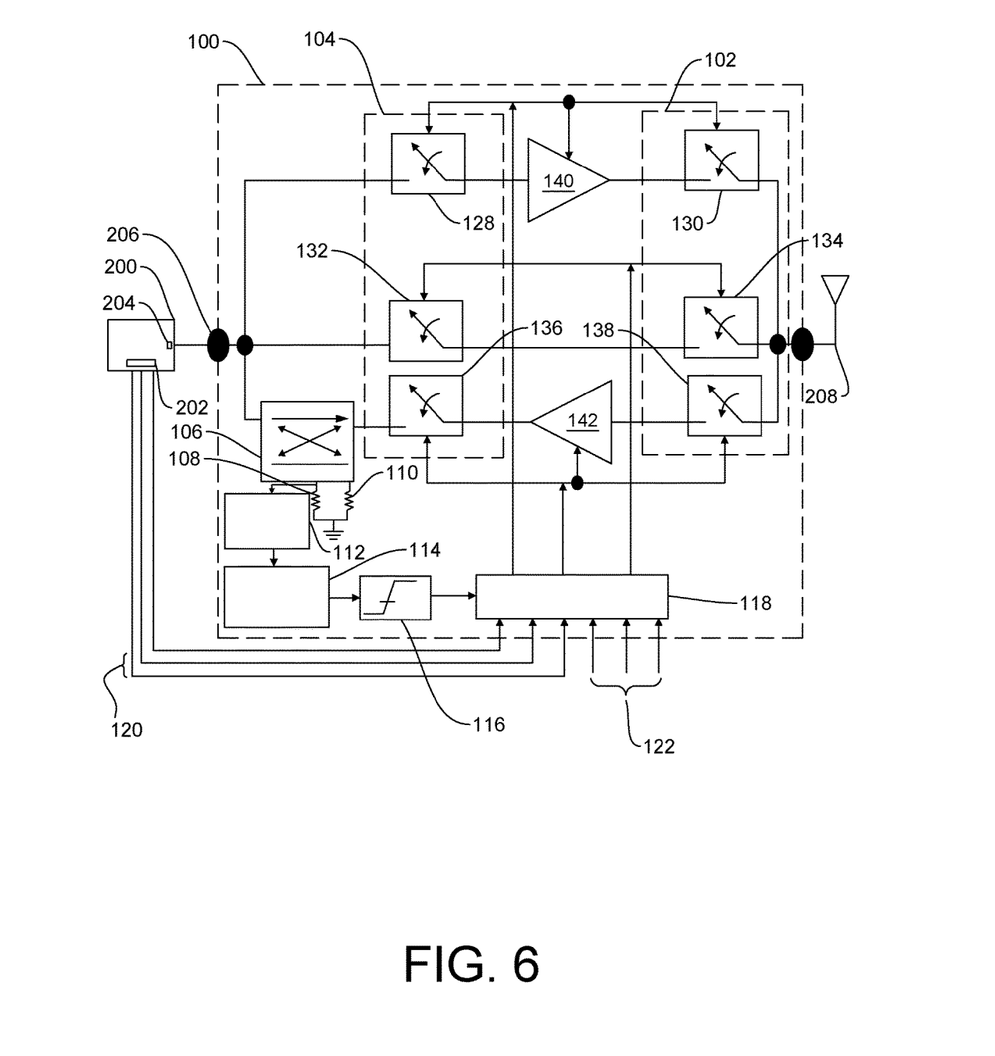
FIG. 6 illustrates a transmit wake-up architecture in radio frequency front ends with a directional coupler used in LNA chain.

FIG. 6 is a block diagram illustrating a transmit wake-up architecture in radio frequency front end 100 with directional coupler 106 used in LNA 142 chain. The transmit wake up RF circuit is in LNA 142 mode. In LNA 142 mode, RF signal from the transceiver 200 is enabling LNA 142 chain and switches SW5 136, SW6 138 and low noise amplifier (LNA) 142 are turned "ON". RF front end 100 comprises input switch block 104 and output switch block 102. Several GPIO (General purpose input-output) pins from a transceiver 200 are connected to logic pins from logic control of RF front end 100. RF signal is taken from coupling port of a directional coupler 106. This same RF signal can be also taken from isolation port of a directional coupler 106 depending on circuit operation. Logic control block 118 is receiving control signals 120 from the transceiver 200. This logic control decodes signal from a transceiver 200 for each particular mode of operation. An envelope detector 112 is used which utilizes a high-frequency RF signal from a transceiver 200 as input and provides an output which is the envelope of the original RF signal. This envelope detector 112 comprises an input terminal and an output terminal wherein the input terminal is connected to one of the directional coupler 106 coupling port. A coupling resistor 108 is connected from the directional coupler 106 coupling port to ground and an isolated resistor 110 is connected from the directional coupler 106 isolation port to ground. An envelope amplifier 114 is connected with envelope detector 112 comprising an input terminal and an output terminal wherein the input terminal is connected to the envelope detector 112 output terminal. A threshold detector or circuitry 116 is implemented in RF front end 100 wake up circuit comprising an input and output terminal wherein the input terminal is connected to the output terminal of the envelope amplifier 114. This RF front end 100 transmit wake-up architecture removes insertion loss of a coupler 106 from bypass chains thereby increasing overall system receive sensitivity and eliminates false triggering of TX-RX 206 chain while signal is received from Antenna 208 through LNA 142 enabled chain.

Figure 7:
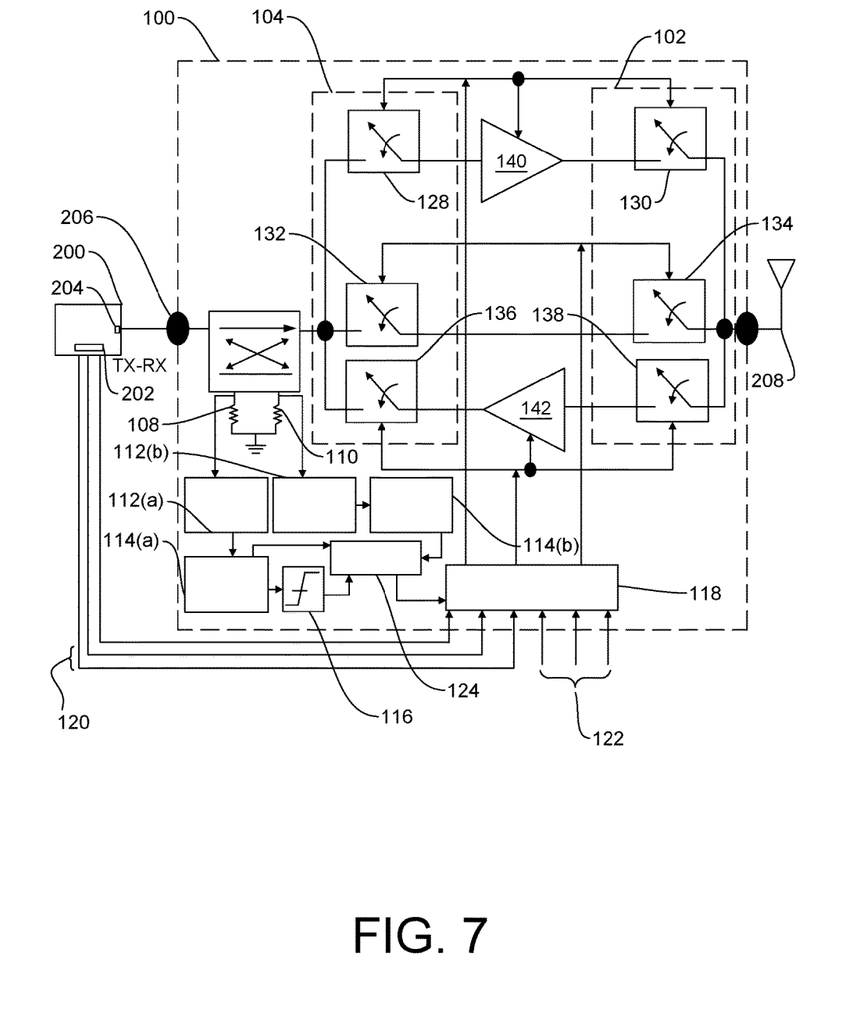
FIG. 7 illustrates a transmit wake-up architecture in radio frequency front ends with a directional coupler coupled with transceiver and two pairs of the envelope detector and envelope amplifier.

FIG. 7 is a block diagram illustrating a transmit wake-up architecture in radio frequency front end 100 with directional coupler 106 coupled with the transceiver 200 and two envelope detectors 112(a) and 112(b) and envelope amplifiers 114(a) and 114(b). In initial steady state condition with bypass chain in "ON" mode, there could be very large signal at the Antenna 208 from an external signal. This may result in a large signal at envelope detector 112(a) from the forward coupled port of a directional coupler 106 in case if return loss of a transceiver 200 has a fairly low level. In the transmit wake-up architecture in radio frequency front end 100 illustrated in FIG. 7, TX-RX 206 chain is triggered "ON" even without an actual transmit signal from a transceiver 200. LNA 142 has fairly high gain and the signal received at Antenna 208 above a certain level can trigger TX-RX 206 chain into "ON" state. A coupling resistor 108 is connected from the directional coupler 106 coupling port to ground and an isolated resistor 110 is connected from the directional coupler 106 isolation port to ground. These two envelope detectors 112(a) and 112(b) and their associated envelope amplifiers 114(a) and 114(b) are connected to a directional coupler 106 with one pair of envelope detector and associated envelope amplifier connected to coupling port and another pair of envelope detector and associated envelope amplifier connected to isolation port. The threshold level is still setting a certain level for TX-RX chain 206 enabling. However forward power from a transceiver 200 port is compared with a signal port. If isolated port power is higher than at coupled port then large signal power is received from the Antenna 208. The transmit wake-up architecture in radio frequency front end 100 of FIG. 7 also involves the use of comparator 124 which enables TX-RX 206 chain by not sending a signal to logic block 118.

As mentioned, there remains the foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

It is to be understood that transceiver may have separated transmit and receive ports as well as RF front end may comprise only two chains while proposed architectures and their operation resemble described above (i.e. transmit with PA and bypass, or transmit with PA and receive with LNA, or bypass for transmit and receive with LNA).

What is claimed is:

1. A transmit wake up front-end architecture comprising:
   an RF front end with an antenna port and a transmit-receive port, wherein the RF front end comprises:
   an output switch block comprising three two terminal switches SW2, SW4, and SW6, each connected on a first terminal, to each other, and to the antenna port;
   an input switch block comprising three two terminal switches SW1, SW3 and SW5, wherein SW1 is coupled at a first terminal through a power amplifier to a second terminal of SW2, and wherein SW3 is connected at a first terminal to a second terminal of SW4 and wherein SW5 is coupled at a first terminal through a low noise amplifier to a second terminal of SW6;
   a four-port directional coupler comprising an input port connected to the transmit-receive port, an isolation port, a coupling port, and a transmit port, wherein the transmit port is coupled to one of the second terminals of switch SW1, the second terminal of SW3, and the second terminal of SW5;
   a coupling resistor connected from the directional coupler coupling port to ground;
   an isolated resistor connected from the directional coupler isolation port to ground;
   an envelope detector comprising an input terminal and an output terminal, wherein the input terminal is connected to one of the directional coupler coupling port and the directional coupler isolation port;
   an envelope amplifier comprising an input terminal and an output terminal, wherein the input terminal of the envelope amplifier is connected to the output terminal of the envelope detector;
   a threshold circuitry comprising an input terminal and an output terminal, wherein the input terminal is connected to the output terminal of the envelope amplifier; and
   a logic control block comprising input and output terminals, wherein one input terminal further comprises a connection to the output terminal of the threshold circuitry and other input terminals comprise digital control signal lines and lines providing hardwired settings, and wherein the output terminals are coupled to operate and control the switches SW1, SW2, SW3, SW4, SW5, SW6, the power amplifier and the low noise amplifier.

2. The transmit wake up front-end architecture as claimed in claim 1, wherein the RF front end comprises three chains, namely, a transmit chain, a receive chain, and a bypass chain, from the antenna to a separate transceiver.

3. The transmit wake up front-end architecture as claimed in claim 1, wherein the envelope detector and the envelope amplifier respond to enable and disable particular logic states to protect a transmit-receive port from very large signals from the transceiver.

4. The transmit wake up front-end architecture as claimed in claim 1, wherein the threshold circuitry applies a signal to a logic block signalling to disable a PA chain and to go into a bypass mode when an RF signal level at the transmit-receive port is below a certain level.

5. The transmit wake up front-end architecture as claimed in claim 1, wherein the envelope amplifier amplifies RF power transmitted by the transceiver coupled through the directional coupler to the envelope detector.

6. The transmit wake up front-end architecture as claimed in claim 1, wherein the logic control block is set in different states.

7. The transmit wake up front-end architecture as claimed in claim 1, wherein RF signal can be taken from both the coupling and the isolation port of the directional coupler during transmit mode of operation.

8. The transmit wake up front-end architecture as claimed in claim 2, wherein the transmit chain is enabled and the LNA chain is disabled when the signal from the transmit-receive port of the transceiver exceeds a certain level.

9. The transmit wake up front-end architecture as claimed in claim 2, wherein the transmit chain is enabled triggering the switches SW1, SW2 and the power amplifier in "ON" mode and the directional coupler used at the input of the transmit chain during the transmit mode of operation.

10. The transmit wake up front-end architecture as claimed in claim 2, wherein the switches SW3 and SW4 are turned "ON" and the directional coupler is used in the bypass chain during the bypass mode of operation.

11. The transmit wake up front-end architecture as claimed in claim 2, wherein the LNA chain is enabled triggering the switches SW5, SW6 and the low noise amplifier in "ON" mode and the directional coupler is used in the LNA chain during receive mode of operation.

12. The transmit wake up front-end architecture as claimed in claim 2, wherein a power limiter is configured between the low noise amplifier and the SW5 to eliminate false triggering of the transmit chain into "ON" mode when the large signal is received at the antenna and steady state condition of the RF front end is set to LNA enabled mode.

13. The transmit wake up front-end architecture as claimed in claim 1, wherein the directional coupler is configured to enable one of the three chains eliminating, insertion loss of the directional coupler from the other two chains.

14. The transmit wake up front-end architecture as claimed in claim 12, wherein the insertion loss of the directional coupler from the bypass and LNA chains is eliminated, increasing overall system receive sensitivity during the transmit mode of operation.

15. The transmit wake up front-end architecture as claimed in claim 12, wherein the insertion loss of the directional coupler from the PA and LNA chains is eliminated, increasing overall system receive sensitivity during the bypass mode of operation.

16. The transmit wake up front-end architecture as claimed in claim 12, wherein the insertion loss of the directional coupler from the bypass chain is eliminated, increasing overall system receive sensitivity in the bypass mode during the receive mode of operation.

17. The transmit wake up front-end architecture as claimed in claim 1, wherein directivity of the directional coupler is chosen such that even the large signal received at the antenna will not trigger the PA into "ON" state during initial mode with LNA enabled and PA gain is large.

18. The transmit wake up front-end architecture as claimed in claim 3, wherein one pair of the envelope detector and the associated envelope amplifier is connected to the coupling port of the directional coupler and another pair of the envelope detector and the associated envelope amplifier is connected to the isolation port of the directional coupler.

* * * * *